United States Patent [19]

Hill, deceased

[11] 4,281,564
[45] Aug. 4, 1981

[54] POWER TRAIN OR TRANSMISSION

[75] Inventor: John W. Hill, deceased, late of Grayslake, Ill., by Gwendolyn K. Hill, administrator

[73] Assignee: Gwendolyn K. Hill, Grayslake, Ill.

[21] Appl. No.: 18,742

[22] Filed: Mar. 8, 1979

[51] Int. Cl.³ .............................................. F16H 37/06
[52] U.S. Cl. .................... 74/665 D; 74/677;
74/687; 74/789; 74/790; 74/768
[58] Field of Search ............... 74/665 D, 677, 687,
74/688, 789, 790, 768, 764

[56] References Cited

U.S. PATENT DOCUMENTS

| | | | |
|---|---|---|---|
| 2,409,196 | 10/1946 | Cunningham | 74/688 |
| 2,834,228 | 5/1958 | Place | 74/789 X |
| 2,880,627 | 4/1959 | Woestemeyer | 74/688 |
| 2,974,543 | 3/1961 | Garrison | 74/677 |
| 3,096,666 | 7/1963 | Christenson et al. | 74/789 |
| 3,313,179 | 4/1967 | Flinn | 74/677 |
| 3,411,382 | 11/1968 | Mori | 74/688 |
| 3,557,635 | 1/1971 | Tuck | 74/677 X |
| 3,915,033 | 10/1975 | Polak | 74/764 X |

Primary Examiner—Ronald Feldbaum
Attorney, Agent, or Firm—Hume, Clement, Brinks, Willian & Olds, Ltd.

[57] ABSTRACT

A power train infinitely variable from substantially 1:1 ratio to a very high ratio, employing a pair of planetary gear assemblies, each including a sun gear, a ring gear and a planetary carrier having at least one planetary gear operatively connecting the associated ring and sun gears, the planetary gear assemblies having different gear ratios, both planetary assemblies having their sun gears rotatable by a driving member, a driven member operatively connected to the planetary carrier of the assembly of higher ratio, the ring gears being constructed for rotation as a unit, and the planetary carrier of the assembly of lower ratio being variably connectible with the driving member, whereby the overall ratio between driving and driven members is variable in dependence upon the relative speed of the driving member and the planetary carrier of the lower ratio assembly.

12 Claims, 7 Drawing Figures

POWER TRAIN OR TRANSMISSION

BACKGROUND OF THE INVENTION

The invention is directed to a power train for the transmission of power from a driving member to a driven member with a variable ratio, particularly from something approaching infinity : 1 to substantially 1:1.

The invention is especially applicable to power transmissions requiring very high starting torque and/or high starting ratios i.e. very slow starting movement.

In many cases it is desirable to provide infinitely variable speed ratios without the use of belts, variable pitch pullies, etc., and particularly where speed and torque, etc., are to be automatically controlled.

BRIEF SUMMARY OF THE INVENTION

The invention enables the production of a power transmission structure which may have an infinitely variable speed ratio from, for example, substantially 1:1 to approaching ∞:1. This is accomplished by the use of two planetary gear assemblies having different gear ratios, in which sun gears are driven in common as the driving members. The planetary gear carrier of the higher ratio assembly forms the output or driven member, while the planetary gear carrier of the lower ratio assembly is connected to the driving member through a suitable clutch or coupling, preferably an infinite ratio coupling, for example, a fluid coupling, magnetic coupling etc.

In its simplest form the two ring gears may be formed as a single rotatable unit and the variable coupling means may, for example, comprise a fluid coupling of known type.

With such construction, upon rotation of the driving member, while the driven member (planetary carrier or higher ratio assembly) remains stationary, the ring gear associated therewith will rotate in the opposite direction to that of the driving member at a speed dependent upon the gear ratio of the assembly. As the ring gear of the lower ratio assembly rotates with that of the higher assembly, the planetary carrier thereof will tend to rotate in the same direction as the driving sun gear thereof but at a reduced speed, dependent upon the difference in gear ratios between the two assemblies. As the driving shaft increases speed, it will, through the variable or fluid coupling associated therewith, tend to rotate the planetary carrier of the lower ratio assembly at a greater speed than that dictated by the planetary ratios, i.e. tend to bring such carrier to the same speed as the driving member.

As soon as such planetary carrier increases speed over said dictated speed, the rotation of the ring gears in the opposite direction will decrease, causing rotation of the planetary carrier of the higher ratio assembly (driven member) to start rotation in the same direction as the driving member, with the speed increasing as the planetary carrier of the lower ratio assembly increases speed over said dictated speed. The driven member thus begins rotation with very high torque resulting from the extremely high gear ratio existing which ratio continually decreases as coupling increases between the driving member and the planetary carrier of the lower ratio assembly. The planetary carrier of the lower ratio assembly thus will eventually come to a standstill at which time the ratio between driving and driven members is equal to the ratio of the planetary assembly of higher ratio and will then further decrease as the planetary carrier of the lower ratio approaches the speed of the driving member whereby the ratio between driving and driven members ultimately approaches 1:1, and if the variable coupling means is such that no slippage then takes place between the driving member and such planetary carrier, a 1:1 ratio will be achieved.

By providing control of the slippage between the driving member and such planetary carrier any type of speed or torque control may be effected. Where, for example, an electromagnetic variable coupling is provided, with suitable speed and torque sensors monitoring appropriate input and output speeds and torques, automatic and computer-controlled transmission systems are readily achievable.

By providing means for disconnecting the variable coupling means from the associated planetary carrier and for rendering the latter stationary, the direction of the driven member may be reversed at a fixed transmission ratio dependent upon the ratios of the two planetary assemblies.

Likewise, by rendering the ring gear unit stationary in such case, instead of the planetary carrier, a fixed ratio low speed in the original direction may be provided.

The construction may be readily designed to provide shift positions or patterns comparable to those of the usual automotive automatic transmission, for example (a) neutral, (b) infinite ratio forward drive, (c) fixed ratio low forward drive, (d) fixed ratio reverse, and if desired, (e) park, in which the driven member is maintained stationary.

BRIEF DESCRIPTION OF THE DRAWING

In the drawing wherein like reference characters indicate like or corresponding parts.

DETAILED DESCRIPTION OF THE INVENTION

Figure 1:
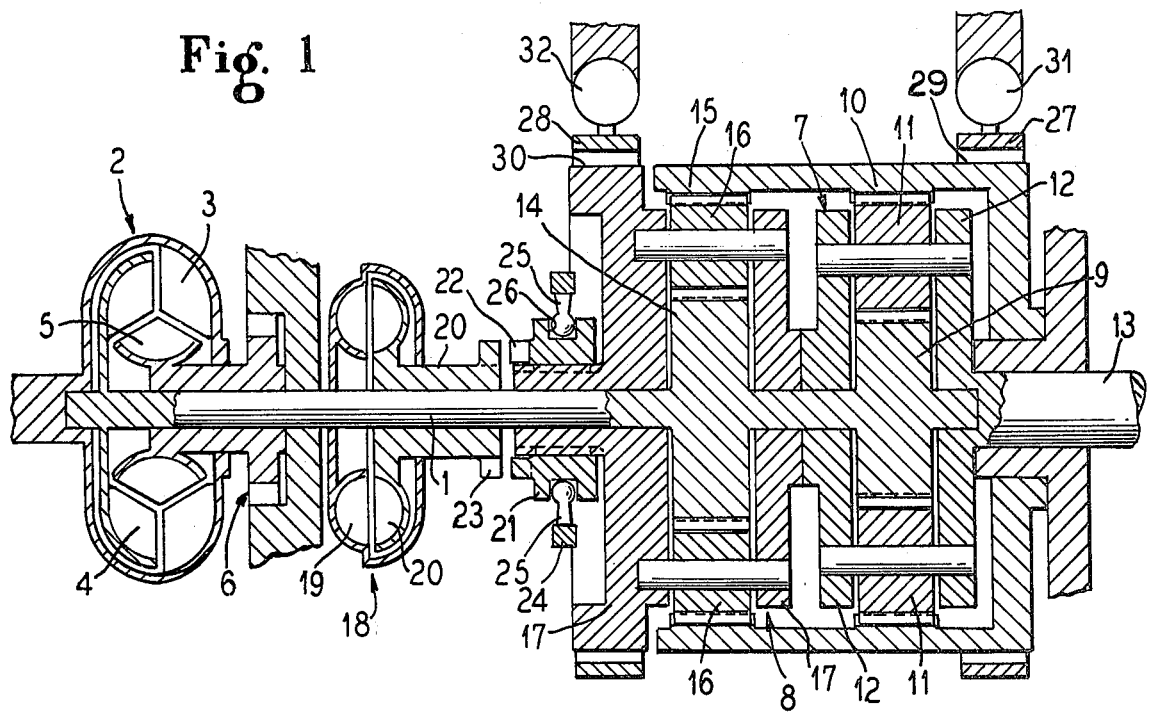
FIG. 1 is a longitudinal section through a transmission train embodying the invention and utilizing a fluid coupling as the variable coupling means, together with a torque converter for connecting the driving member to a power source.

Referring to FIG. 1, the reference numeral 1 indicates generally a driving member, for example a drive shaft, adapted to be connected to a power source through a suitable torque converter indicated generally by the reference numeral 2, of common design, having a driving rotor 3, a driven rotor 4 connected to the shaft 1, and stator 5, adapted for example, to be connected to a stationary structure, as for example the transmission housing or the like, through a one-way clutch indicated generally by the numeral 6.

Reference numerals 7 and 8 designate generally a pair of planetary gear assemblies, the assembly 7 having a sun gear 9, a ring gear 10 and preferably a plurality of planetary pinions 11 (only one of which is illustrated) supported in a planetary pinion carrier 12, the latter forming the driven member of the structure and illustrated as connected to an output shaft 13.

In like manner the assembly 8 comprises a sun gear 14, a ring gear 15, and a plurality of planetary pinions 16 (only one of which is illustrated) supported in a planetary pinion carrier 17.

The planetary pinions preferably would be symmetrically disposed about the axis of the drive shaft 1, and for example, if three pinions were employed in each assembly would be arranged 120° apart. In view of the substantially completely symmetrical arrangement, no need is seen to illustrate a transverse section.

In the embodiment illustrated, the two ring gears 10 and 15 are connected and rotatable as a unit. The carrier 17 is adapted to be variably connected to the shaft 1 by a suitable variable coupling 18, illustrated in FIG. 1 as a fluid coupling having a driving rotor 19 carried by the drive shaft 1, and a driven rotor 20 which is connectible to the carrier 17. The means for selectively effecting a rigid connection between the driven rotor 20 and the planetary carrier 17, in the embodiment illustrated, comprises an axially movable ring member 21 suitably splined or keyed to the hub of the carrier 17 and having a plurality of teeth 22 thereon engageable with cooperable teeth 23 on the driven rotor 20. Thus by appropriate movement of the ring 21, for example by suitable yoke 24 having fingers 25 riding in the peripheral slot 26 in the member 21, the latter, while rotating, may be moved into and out of locking position. If desired, a suitable "synchromesh" type of interlocking structure may be utilized.

The ring gear unit 10-15 and the carrier 17 are adapted to be selectively rendered stationary by respective suitable means illustrated, for example, as comprising non-rotatable locking bands 27 and 28 adapted to selectively engage respective drum portions 29 and 30 of the ring gear unit 10-15 and carrier 17. The band 27 is adapted to be suitably actuated to drum-locking position by suitable means such as a hydraulic cylinder 31, and in like manner, the band 28 by a hydraulic cylinder 32. It will be appreciated that such means could, if desired, be mechanically actuated, either by mechanical actuation of the respective locking bands, or by use of respective interlocking clutch means or the like, as for example, utilized in the connection of the rotor 20 and carrier 17.

The transmission of FIG. 1 is of a type readily adaptable to use as an automotive transmission and operation will therefore be described on such basis.

FIGS. 2 through 6 illustrate the different modes of operation to provide a shift arrangement comparable to that of the usual automatic car transmissions, such diagrammatic figures being reduced to bare essentials to show the operation and conveying only necessary reference numerals. FIGS. 2-6 thus respectively illustrate shift positions of neutral, infinite ratio drive, fixed ratio reverse, fixed ratio low drive and park, with each planetary assembly being illustrated with two oppositely disposed planetary pinions.

Figure 2:
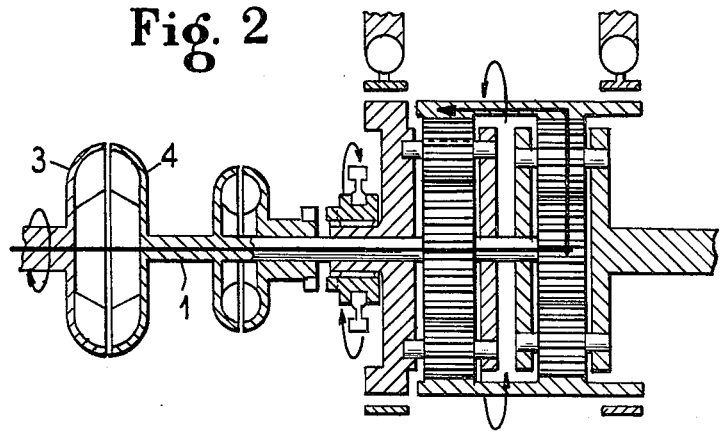
FIGS. 2 through 6 are diagrammatic figures, similar to FIG. 1, respectively illustrating shift positions of neutral, infinite drive, reverse (fixed ratio), low drive (fixed ratio), and a park position.

Referring to FIG. 1, it will be appreciated that control is effected by selective actuation of three means, the means for actuating the band 27, the means for actuating the band 28, and the means for connecting the driven rotor 20 of the fluid coupling with the pinion carrier 17. FIG. 2 illustrates the condition in which none of these means are actuated so that no connection exists between rotor 20 and carrier 17, and both the latter and the ring gear unit 10-15 are free to rotate. Consequently, no driving connection is established between the driving member 1 and the output shaft 13, irrespective of rotation of the shaft 1, as the gear assemblies will merely idle.

Figure 3:
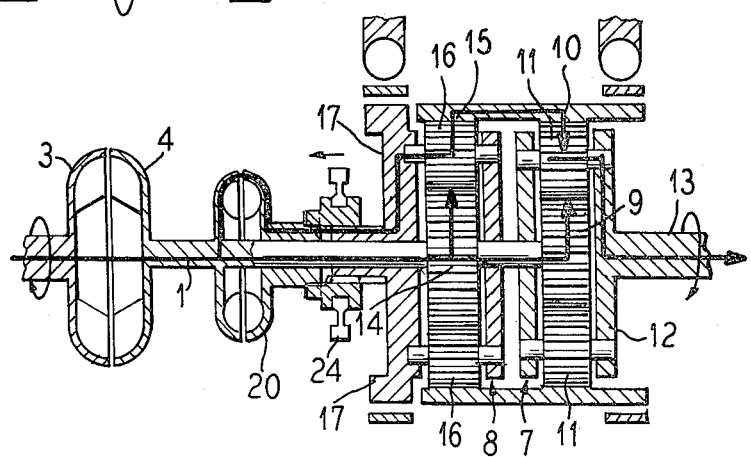

FIG. 3 illustrates the condition in which both bands 27 and 28 are inoperative and the rotor 20 is connected to the carrier 17 through the member 21. Assuming a load exists on the driven shaft 13 and power is applied through the convertor 2 to the shaft 1 in a clockwise direction, (as viewed from the left or convertor end of the structure), initially the shaft 13 will thus remain stationary due to the load thereon and the sun gear 9 will rotate pinions 11 about their axes to rotate ring gears 10-15 in a counterclockwise direction. As the larger sun gear 14 is rotating at the same speed as sun gear 9, pinion carrier 17 will initially rotate relatively slowly (as compared with shaft 1) in a clockwise direction, the speed being determined by the difference in ratios between the two planetary assemblies (assembly 7 having the higher ratio and assembly 8 having the lower ratio). Thus, for example if assembly 7 has a 2:1 ratio and assembly 8 a 1.5:1 ratio, carrier 8 would rotate 1/6th the speed of the shaft 1.

As the speed of shaft 1 increases in response to power applied to the converter 2, the fluid coupling 18 will begin to apply power to the carrier 17 tending to increase its speed with respect to the shaft 1 over the original dictated speed. Such increase will thus tend to slow down counterclockwise rotation of the ring gears 10-15, applying torque to the carrier 12 and as soon as the applied torque is sufficient, rotation of the shaft 13 at a very high initial overall ratio with respect to the driving shaft 1 will take place. As the rotative speed of the carrier 17 increases with respect to that of the shaft 1, as the coupling is increased in the fluid coupling 18, counterclockwise movement of the ring gear unit will slow down. This action will continue until counterclockwise rotation of the ring gear ceases, at which point the overall ratio between the drive shaft 1 and output shaft 13 will correspond to the ratio of the planetary assembly 7 and as the ring gear unit begins rotation in a clockwise direction the overall ratio will continue to become lower. Assuming an eventual theoretically rigid connection at the coupling 18, both planetary assemblies will be rotating at the same speed as the shaft 1. Consequently, the ring gear 10 and sun gear 9 will interlock the planetary assembly 12 therewith and thus rotate the shaft 13 at the same speed to provide a 1:1 ratio.

Figure 4:
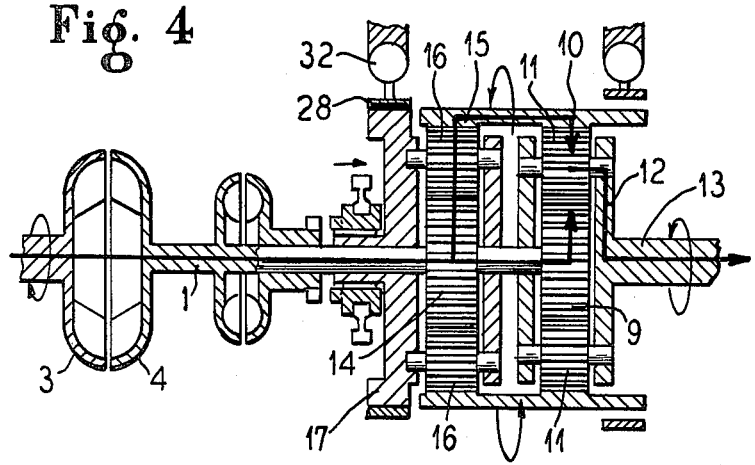

FIG. 4 illustrates the operation of the structure to provide reverse rotation of the shaft 13, in which case rotor 20 remains disconnected and only the cylinder 32 is actuated whereby the band 28 will clamp the carrier 17 in stationary position. Power transmission is then transmitted through both planetary assemblies with the ring gear unit being driven in counterclockwise direction by the pinions 16 and sun gear 14 at a speed determined by ratio of the planetary assembly 8 (the lower assembly). This action forces the planetary carrier 12 and thus shaft 13 to rotate in counterclockwise direction at a fixed ratio determined by the difference in ratio between the two planetary assemblies.

However, if desired, the reversing elements 28, 30, 32 may be omitted and reverse gears provided at the output shaft 13, in which case the respective control elements of the transmission would be disposed to provide infinite ratio drive at the carrier 12 with the shaft 13 being reversed to rotation of the carrier by means of additional reverse gearing.

As the ratio between shafts 1 and 13 when the driving forces are reversed (shaft 13 applying the power and shaft 1 becoming the driven shaft), will approach 1:1 when in infinite ratio drive illustrated in FIG. 3, provision may be made in the construction described for connection of shafts 1 and 13 in a fixed ratio, termed "low fixed-ratio drive".

Figure 5:
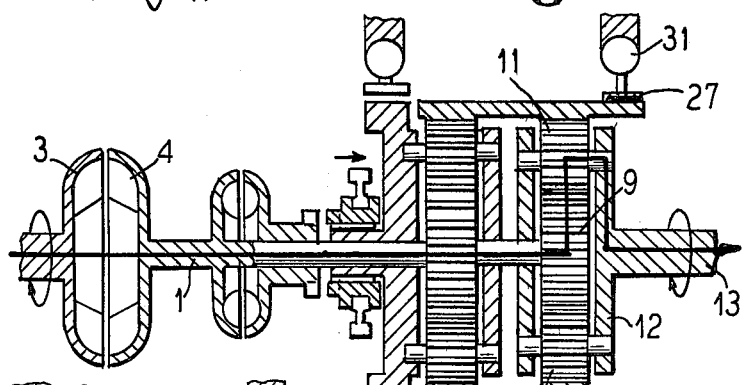

This arrangement is illustrated in FIG. 5, in which only the cylinder 31 and thus the band 27 is actuated, resulting in the ring gear unit being clamped by the band 27 in stationary relation, and the rotor 20 remaining disconnected. Power is now transmitted solely through sun gear 9 and ring gear 10 to the planetary carrier 12 and shaft 13 at the fixed ratio of the planetary assembly 7. Use of such fixed ratio may be desirable, for example, when going downhill and it is desired to use the braking action of the vehicle engine.

Figure 6:
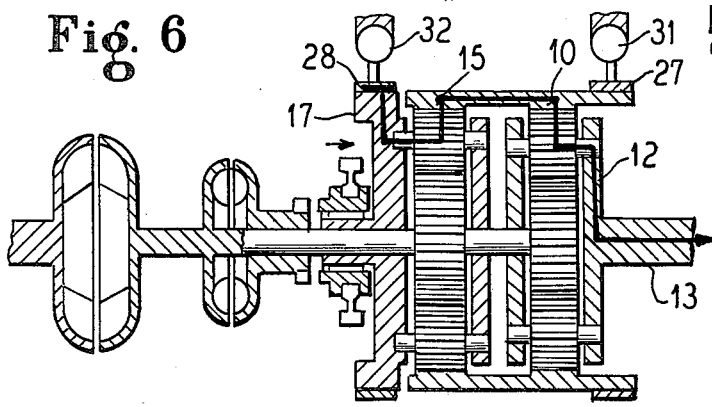

FIG. 6 illustrates one arrangement for locking the shaft 13 in stationary position, generally corresponding to "park" position of the usual automatic transmission. In this arrangement both hydraulic cylinders are actuated whereby both the ring gear unit 10-15 and the pinion carrier 17 are maintained stationary with both planetary assemblies thereby being locked and thus likewise both shafts 1 and 13.

Figure 7:
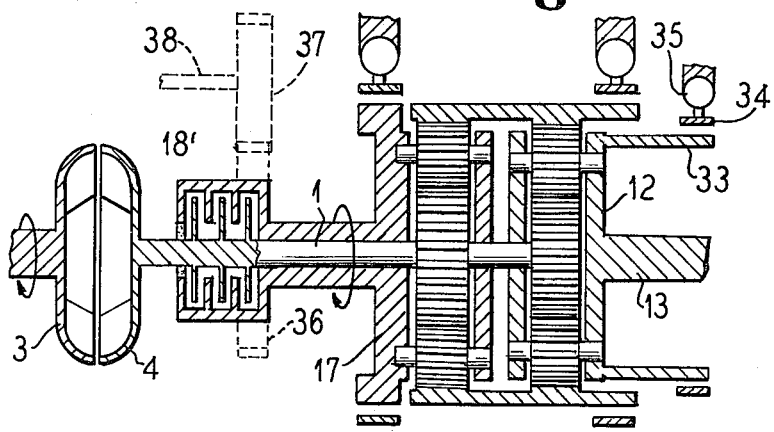
FIG. 7 is a diagrammatic figure similar to FIGS. 2–6 illustrating the use of a magnetic coupling, the use of additional means for locking the driven member in a "park" position, and the use of two power sources.

If it is desired to lock only the shaft 13, as illustrated in FIG. 7, there may, for example, be provided an additional drum 33, carried by the pinion carrier 12 and a cooperable band 34 adapted to be actuated by a hydraulic cylinder 35 or other suitable means. Thus by actuation of only the band 34, the shaft 13 may be held stationary while all remaining parts may be in the same neutral positions illustrated in FIG. 2.

FIG. 7 also illustrates the use of a magnetic clutch 18' in place of the fluid coupling 18, the clutch being of the "infinite" type capable of providing controlled slippage from no connection to substantially rigid connection, and thus eliminates the need for the additional disconnect means 21 to provide the "neutral" position.

It will be appreciated that the invention is also applicable to an arrangement in which two independent or related power sources are employed, one being suitably connected to the shaft 1 and the other suitably connected to the planetary carrier 17 whereby independent rotation may be effected to each. FIG. 7 illustrates in broken lines how a gear 36 may be connected to the carrier 17 in lieu of the clutch 18' with the gear 36 being adapted to be connected to a second drive shaft 38 through a connecting pinion 37.

It will be appreciated that the drawing illustrates the invention for the purposes of explanation and thus does not show anti-friction bearings or other mechanical details of construction not necessary to an understanding of the invention, all of which could readily be provided, as desired, by one skilled in the art.

It will also be appreciated that, as previously mentioned, the transmission described readily adapts itself to automatic operation and control by a computer or otherwise through the use of suitable torque and speed sensors which monitor input and output speeds and torque to readily provide, for example, constant torque or speed characteristics at the output shaft.

Likewise, it will be obvious to those skilled in the art that while I have illustrated the transmission in a form adapted for use as an automotive transmission, the invention may be readily utilized in various types of power equipment and the like, for example, without the reverse or fixed-ratio drive, park, neutral, etc.

Having thus described my invention it will be obvious that various immaterial modifications may be made in the same without departing from the spirit of my invention.

I claim:

1. A power train variable from substantially a 1:1 ratio to a higher ratio, comprising a driving member and a driven member, a pair of planetary gear assemblies, each including a sun gear, a ring gear and a planetary carrier having at least one planetary gear operatively connecting the associated ring and sun gears, said gear assemblies having different gear ratios, both planetary assemblies having their sun gears rotatable by said driving member, said driven member being operatively connected to the planetary carrier of one of said assemblies, means connecting said ring gears for rotation as a unit, and means for selectively rotating the planetary carrier of the other of said assemblies at desired speeds with respect to the driving member, whereby the overall ratio between the driving and driven members is variable in dependence upon the relative speeds of said driving member and said planetary carrier of said other of said assemblies.

2. A power train according to claim 1, wherein said driven member is connected to the planetary carrier of the assembly of higher ratio, and the planetary carrier of the assembly of lower ratio is selectively rotatable by said planetary carrier rotating means, with the overall ration between the driving and driven members being variable in dependence upon the relative speeds of said driving member and said planetary carrier of the lower ratio assembly.

3. A power train according to claim 2, wherein said drive shaft is connected to one rotative source, and said means for rotating said planetary carrier of the lower ratio assembly comprises a second rotative source.

4. A power train according to claim 2, wherein independently operable reversing gears are provided at the driven member for reversing rotation thereof with respect to the rotation of the associated planetary carrier.

5. A power train according to claim 2, wherein said means for rotating said planetary carrier of the lower ratio assembly comprises means selectively connecting said assembly to the driving member.

6. A power train according to claim 5, wherein said means selectively connecting said planetary carrier and the driving member comprises a fluid coupling having a driving element connectible to said driving member and a driven element connectible to said planetary carrier.

7. A power train according to claim 5, wherein said means selectively connecting said planetary carrier and the driving member comprises a magenetic clutch having a driving element, a driven element and means for effecting a variable coupling between said elements, the driving elements being connected to said driving member and the driven element to said planetary carrier.

8. A power train according to claim 5, wherein said ring gears are rigidly connected, means for selectively connecting and disconnecting said variable connecting means and said planetary carrier of the assembly of lower ratio, means for selectively maintaining the last-mentioned planetary carrier stationary, and means for selectively maintaining said ring gear of the planetary assembly of higher ratio stationary, whereby the following conditions may be selectively established:

a. Neutral position where no operative connecting exists between said variably coupling and the cooperable planetary carrier, and neither the latter or said ring gear of the lower ratio assembly is maintained stationary, b. Variable-ratio position wherein said fluid coupling is operatively connected to the cooperably planetary carrier and neither the latter or said ring gear of the lower ratio assembly is maintained stationary, c. Low fixed-ratio position when only said ring gear is maintained stationary and said fluid coupling is connected, d. Reverse fixed-ratio position when only said cooperable planetary carrier is maintained stationary and said fluid coupling is disconnected.

9. A power train according to claim 8, wherein said respective stationary-maintaining means are constructed for simultaneous operation to maintain both the ring gear unit and said cooperable planetary carrier stationary, thus rendering the driven member stationary.

10. A power train according to claim 8, wherein means is provided acting directly on the driven member for rendering the latter stationary.

11. A power train according to claim 8, wherein said means selectively connecting said planetary carrier and the driving member comprises a fluid coupling having a driving element connectible to said driving member and a driven element connectible to said planetary carrier.

12. A power train according to claim 8, wherein said means selectively connecting said planetary carrier and the driving member comprises a magnetic clutch having a driving element, a driven element and means for effecting a variable coupling between said elements, the driving elements being connected to said driving member and the driven element to said planetary carrier.

* * * * *

UNITED STATES PATENT AND TRADEMARK OFFICE
CERTIFICATE OF CORRECTION

PATENT NO. : 4,281,564
DATED : August 4, 1981
INVENTOR(S) : John W. Hill, deceased It is certified that error appears in the above—identified patent and that said Letters Patent is hereby corrected as shown below:

In the Abstract, line 1, insert -- a -- before "1:1".

Column 1, line 36, delete "or" and insert therefor --of--.

Column 4, line 21, delete "has" and insert therefor --had--.

Column 4, line 22, insert -- at -- after "rotate".

Column 4, line 39, delete "the".

Column 5, line 45, delete "to" and insert therefor --of--.

Column 6, line 29, delete "ration" and insert therefor --ratio--.

Signed and Sealed this

Second Day of February 1982

[SEAL]

Attest:

Attesting Officer

GERALD J. MOSSINGHOFF

Commissioner of Patents and Trademarks